(12) United States Patent
Condron (10) Patent No.: US 12,008,557 B2
(45) Date of Patent: Jun. 11, 2024

(54) METHOD, APPARATUS, AND COMPUTER-READABLE MEDIUM FOR ROUTING DATA SERVICES OVER A DECENTRALIZED NETWORK

(71) Applicant: Titan IO, Inc., Winston-Salem, NC (US)

(72) Inventor: Ryan Kelly Condron, Winston-Salem, NC (US)

(73) Assignee: Titan IO, Inc., Winston-Salem, NC (US)

( * ) Notice: Subject to any disclaimer, the term of this patent is extended or adjusted under 35 U.S.C. 154(b) by 703 days.

(21) Appl. No.: 17/061,638

(22) Filed: Oct. 2, 2020

(65) Prior Publication Data
US 2021/0103923 A1 Apr. 8, 2021

Related U.S. Application Data

(60) Provisional application No. 62/909,822, filed on Oct. 3, 2019, provisional application No. 62/909,827, filed on Oct. 3, 2019.

(51) Int. Cl.
| | |
|---|---|
| *G06Q 20/38* | (2012.01) |
| *G06Q 30/0645* | (2023.01) |
| *H04L 9/00* | (2022.01) |
| *H04L 9/08* | (2006.01) |
| *H04L 67/104* | (2022.01) |

(52) U.S. Cl.
CPC ..... *G06Q 20/3829* (2013.01); *G06Q 30/0645* (2013.01); *H04L 9/00* (2013.01); *H04L 9/088* (2013.01); *H04L 67/104* (2013.01)

(58) Field of Classification Search
CPC ............... G06Q 20/00–425; H04L 9/00–50
See application file for complete search history.

(56) References Cited

U.S. PATENT DOCUMENTS 9,813,303 B1 * 11/2017 Guigli ................. H04L 61/5014
10,677,607 B2 * 6/2020 Xia ..................... G01C 21/3885
(Continued)

FOREIGN PATENT DOCUMENTS

| CN | 107315786 B | * 12/2020 | ............ G06F 16/211 |
| KR | 102085695 B1 | * 12/2023 | |

(Continued)

OTHER PUBLICATIONS

KR102085695B_MT (Year: 2023).*
(Continued)

*Primary Examiner* — Ari Shahabi
(74) *Attorney, Agent, or Firm* — Rimon PC; Marc S. Kaufman (57) ABSTRACT

An apparatus, computer-readable medium, and computer-implemented method to provide data services over a decentralized network in accordance with a smart contract. Node computing platforms of the decentralized network include a node module to execute the network protocol and a router module to route service data and proofs thereof. The disclosed architecture and method fully leverage the advantages of decentralized networks to transform data services into decentralized commodities that can be offered, sold, provided and managed in a decentralized manner.

14 Claims, 7 Drawing Sheets

(56) References Cited

U.S. PATENT DOCUMENTS

| | | | | |
|---|---|---|---|---|
| 2012/0216194 A1* | 8/2012 | Hadas | ................. | H04L 12/4641 |
| | | | | 718/1 |
| 2015/0188949 A1* | 7/2015 | Mahaffey | ............ | H04L 63/0272 |
| | | | | 726/1 |
| 2015/0324789 A1* | 11/2015 | Dvorak | ................ | H04L 9/3297 |
| | | | | 705/67 |
| 2018/0198794 A1* | 7/2018 | Huh | ...................... | H04L 9/3239 |
| 2018/0294955 A1* | 10/2018 | Rhie | ........................ | G06F 16/27 |
| 2019/0260574 A1* | 8/2019 | Shi | ........................... | H04L 63/00 |
| 2019/0356641 A1* | 11/2019 | Isaacson | ............... | H04L 9/3231 |
| 2020/0226595 A1* | 7/2020 | Shah | ....................... | G06Q 20/40 |
| 2021/0067467 A1* | 3/2021 | Cidon | .................... | H04L 49/252 |
| 2022/0200898 A1* | 6/2022 | Zheng | ....................... | H04L 9/50 |

FOREIGN PATENT DOCUMENTS

| | | | | |
|---|---|---|---|---|
| WO | WO-2018228337 A1 * | 12/2018 | ............. | G06F 16/211 |
| WO | WO-2019165330 A1 * | 8/2019 | | |

OTHER PUBLICATIONS

CN107315786B Trans (Year: 2023).*
KR102125081B1—preview from IP.com (Year: 2023).*
KR102085695B1 Google Translate (Year: 2023).*
BitTorrent—Wikipedia (Year: 2023).*
BitTorrent—Wikipedia Youtube (Year: 2023).*
Wang Blockchain-Based_Fair_Payment_Protocol_for_Deduplication_Cloud_Storage_System (Year: 2019).*
Ajay Kumar Shrestha A Blockchain Platform for User Data Sharing Ensuring User Control and Incentives (Year: 2020).*
For Definition & Meaning—Merriam-Webster (Year: 2023).*
From Condron Linked In profile (Year: 2023).*
Hash Power _ Hash Rate _ Alexandria (Year: 2023).*
Jacob Wade Investopedia Hash Rate (Year: 2022).*
Hashcash—Bitcoin Wiki Apr. 8, 2022, at 16:33. (Year: 2022).*
Hashcash by Back (Year: 2002).*
HashcashCryptocurrency Youtube (Year: 2023).*
Hashpower—What is _buying hash rate_and how could it be profitable_—Bitcoin Stack Exchange (Year: 2022).*
Matthew Roszak Chairman, Chamber of Digital Commerce Co-Founder, Bloq, Inc. (Year: 2016).*
Interview With Matthew Roszak—Founding Partner, Tally Capital _ by Jacob Donnelly _ Crypto Brief _ Medium (Year: 2015).*
Linkedin Profile Roszak (Year: 2023).*
Matthew Roszak The Future of Mining The Evolution of Hashpower TNABC 2020 (Year: 2020).*
Yaga NIST.IR.8202 (Year: 2018).*
Of Definition & Meaning—Merriam-Webster (Year: 2023).*
Scrypt proof of work—Bitcoin Wiki Apr. 24, 2019, at 00:19 (Year: 2019).*
Titan_WhitepaperV0_9 not secured (Year: 2019).*
What are Data Services_—Definition from Techopedia (Year: 2023).*
What Is Layer 0 in Blockchain_ _ Binance Academy Feb. 1, 2023 (Year: 2023).*
Andreas M. Antonopoulos, "Mastering Ethereum", Dec. 23, 2018, O'Reilly Media, Inc., First Edition (Year: 2018).*
WO2019165330A1 (Year: 2019).*

* cited by examiner

METHOD, APPARATUS, AND COMPUTER-READABLE MEDIUM FOR ROUTING DATA SERVICES OVER A DECENTRALIZED NETWORK

RELATED APPLICATION DATA

This application claims priority to US Provisional Application Ser. No. 62/909,827 filed on Oct. 3, 2019 and US Provisional Application Ser. No. 62/909,822 filed on Oct. 3, 2019, the entire disclosures of which are incorporated herein by reference.

BACKGROUND

It is well known to provide decentralized networks through distributed ledger technology (DLT). DLT provides a shared transaction database (referred to as a "ledger" herein) that does not require a central trusted authority to maintain accuracy. In a blockchain, one example of DLT, transactions can be recorded as "blocks" of data stored on a ledger in a linear chain. Each block in the chain contains transaction data and is cryptographically hashed. The blocks can include a hash of the previous-block in the chain. This makes it computationally very difficult to change data in one block because it would also require changing all subsequent blocks in the chain. A consensus mechanism is used to authenticate the transactions and record the blocks on the ledger. The ledger data is stored on multiple devices in a peer-to-peer network resulting in a ledger that is, in a pragmatic sense, immutable.

The original use for blockchain was as a ledger for Bitcoin, a cryptocurrency which utilizes blockchain to record transactions and thus prevent the double spend problem associated with previous digital currencies. Bitcoin was introduced in 2008 using a Byzantine Fault Tolerant consensus algorithm known as "Proof of Work" (POW). The POW algorithm provides consensus by requiring that block producers known as "miners" solve a cryptographic puzzle, thus creating friction for would-be block producers. POW thus acts as a digital "turnstile" for the ledger.

The data stored on a distributed ledger can also include automatically executable code known as a "smart contract." Smart contracts can be used to facilitate, verify, or enforce the performance of an agreement. As just one simple example a smart contract can receive funds from two parties making a bet on a sporting event, ascertain the winning team after the event from a data source known as and "oracle," and automatically make a payout to the party that bet on the winning team. Participants and smart contracts can be identified by, and interact with the blockchain through, cryptographic wallets that represent an address on the decentralized network. Other known applications for DLT include equities trading, supply chain monitoring, and settlement of foreign exchange.

Typically, digital tokens (referred to simply as "tokens" herein) that are limited in supply and for which ownership is recorded on the ledger, are used in DLT transactions. Bitcoin is just one example of such tokens. Many financial instruments, and even physical goods, can be "tokenized", i.e. represented by a token. For example, it is known to tokenize various assets, such as real estate and financial instruments, and trade the tokens on a decentralized platform to represent ownership interest in the assets.

It is also known to provide content distribution over a decentralized network. For example, various versions of BitTorrent client software, which are computer programs designed for peer-to-peer file sharing using the BitTorrent protocol, are available. The BitTorrent protocol provides a mechanism for verifying that the data has been sent but does not provide an architecture or protocol for permitting terms, other than a simple request for a file, to be implemented in connection with provision of a service.

Many data services, such as compute power and data transfer, are not readily tokenized and existing architectures do not permit data services to be reliably adapted to be sold, traded and managed on decentralized networks. Therefore, such services are traditionally provided only by centralized trusted parties. For example, Amazon Web Services™ sells compute power on the Amazon™ platform. Amazon is, of course, a centralized system. As one consequence of this centralization, parties cannot readily exchange Amazon™ compute power for other services offered on other centralized networks, such as Microsoft Azure™. Other examples of data services sold on centralized networks are Netflix™ (digital entertainment content) and Genesis Mining™ (Bitcoin mining hash power).

"Mining hash power" refers to the compute power required to solve the above-noted cryptographic puzzle to create blocks on a blockchain. As noted above, mining is an integral part of the consensus mechanism of many decentralized systems. As the Bitcoin network has matured and other alternative POW networks have since launched, the amount of required hash power has skyrocketed. This skyrocketing demand over the years has created an ongoing global hunt for cheap stable electricity as well as an engineering arms race for faster more efficient hardware. Ironically, to date, similar to many data services, there are no decentralized markets for purchasing hash power because of the limitations of current technology noted above.

SUMMARY

One aspect of the invention is a method implemented by a smart contract executed on a decentralized network of computing devices for routing data services over the decentralized network, the decentralized network including multiple node computing platforms communicating over a network in a peer to peer manner, each node computing platform including a decentralized node protocol module and a corresponding network router module, whereby the node computing platforms each define a node of the decentralized network that records data on a ledger in accordance with a consensus mechanism, the method comprising: monitoring, by a router module of at least one of the node computing platforms, data flow through at least one node computing platform of the decentralized network, wherein the at least one node computing platform is associated with a data service external to the decentralized network; detecting, by the router module of the at least one node computing platform, data flow relevant to provision of the data service; receiving, by the router module of at least one of the node computing platforms, a data structure indicating attributes of the provision of the data service; routing, by the router module of the at least one of the node computing platforms, the data flow in a predetermined manner through the router module in accordance with a smart contract stored on the ledger; authenticating, using the consensus mechanism, the data flow to confirm that data service has been received by a specified recipient; and routing compensation, in the form of digital tokens, for the provision of the data service through the decentralized network in accordance with the smart contract.

Another aspect of the invention is a computing architecture for executing a smart contract executed on a decentralized network of computing devices for routing data services over the decentralized network, the architecture comprising: multiple node computing platforms communicating over a network in a peer to peer manner, each node computing platform including a decentralized node protocol module and a corresponding network router module, whereby the node computing platforms each define a node of the decentralized network that records data on a ledger in accordance with a consensus mechanism and whereby the network router modules are configured to route data services and provide data as events to the smart contract.

Another aspect of the invention is a method of configuring a distributed network of computing devices for routing data services over a decentralized network, the decentralized network including multiple node computing platforms communicating over a network in a peer to peer manner, each node computing platform including a decentralized node protocol module and a corresponding network router module, whereby the node computing platforms each define a node of the decentralized network that records data on a ledger in accordance with a consensus mechanism, wherein at least one of the nodes in the decentralized network is associated with a data service external to the decentralized network, the method comprising: storing a smart contract on the ledger, the smart contract including executable code for monitoring the data service, routing data corresponding to the data service through the node, and routing compensation, in the form of tokens, through the decentralized network to a provider of the data service; exposing terms, parameters and network addresses associated with the data service on the ledger whereby parties associated with nodes of the decentralized network can subscribe to the data service, receive the data service, and pay for the data service over the decentralized network.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Compute power, such as hash power (also known as "hashrate"), and other data services have the potential to become a "next-gen" commodity. The disclosed implementations are a decentralized peer-to-peer network architecture, smart contract protocol and token that provide programmability for routing, performance and confirmation of various data services as well as generation and attribution of the proceeds. The resulting technology is a decentralized platform that can facilitate the global buying, selling, routing and fulfillment of compute power and other digital services.

Implementations disclosed herein facilitate a decentralized network for providing data services, by overcoming several obstacles of conventional systems. For the network to facilitate the needs of a global ecosystem it will need an architecture and protocol that can accommodate millions of simultaneous users in an asynchronous fashion to provide scalability and a good user experience. The security of the network and the data therein should be independent of the number of users engaged or nodes connected to the network. Further, as many networks grow in popularity, so do the costs of their transactions creating a barrier for rapid adoption and utilization. The network must be designed to have free or inexpensive means of transaction processing while still providing proper ongoing incentives to data service providers, such as POW miners. Also, to adapt to the provision of various data services, the network will need to employ a robust and flexible governance system to ensure that there is always a path forward.

The network will need to utilize a consensus algorithm to ensure network consensus. Preferably the algorithm has Byzantine Fault Tolerance. The disclosed implementations utilize the Scrypt proof of work consensus algorithm; however, any DLT protocol and consensus mechanism can be used. The disclosed implementations also provide a Turing complete smart contract layer to allow users to create smart contracts for specific data services and compensation models to thereby scale the functionality of the network organically. Further, the network protocol must have methods in place to prove that a data service exists, and subsequently to confirm that a specific data service was provided/performed. Disclosed implementations are able to track and route the provision of data services with a provable amount of algorithm difficulty. As noted above, one example of a data service that can be managed by the disclosed implementations is POW hashrate/hashpower. However, the implementations can be applied to the provision of any data service over a decentralized network.

Figure 1:
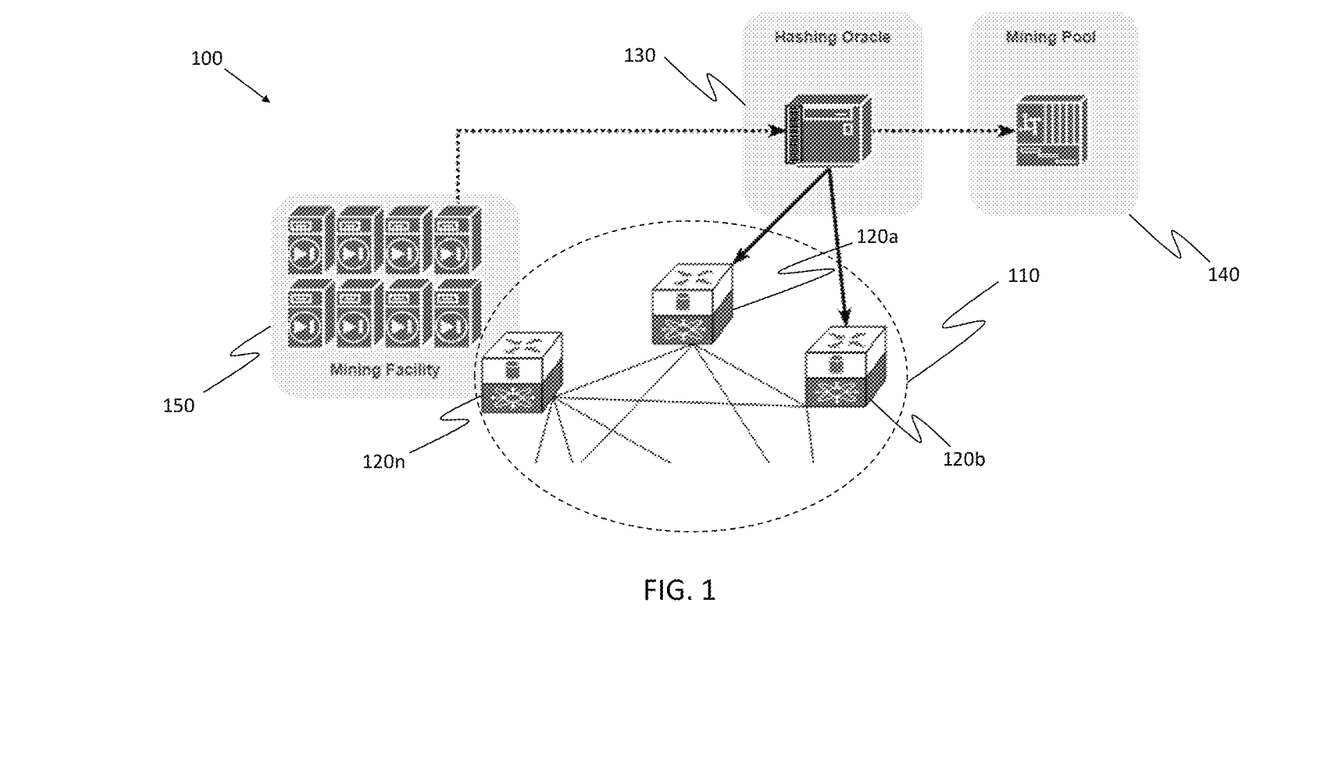
FIG. 1 is a schematic illustration of an architecture using a hashing oracle to verify hashing power.

As noted above, in order to provide a data service over a decentralized network, the service capacity and delivery must be proven in a trustless manner. This can be accomplished in increasing levels of decentralization. FIG. 1 illustrates a first level of integration of a data service into a decentralized network for providing the data service of hashpower for a POW consensus mechanism or the like. The data service provider is a blockchain mining facility and the data service consumer is a blockchain mining pool. In the context of cryptocurrency mining, a mining pool is the pooling of resources by "miners" who share their processing power over a network, to split the reward equally according to the amount of work they contributed to the probability of finding a block. A "share" is awarded to members of the mining pool who present a valid partial proof-of-work. Mining in pools allow many mining devices/facilities at various locations to combine their computing power to generate blocks more quickly and receive a portion of the block reward on a more regular basis. As shown in FIG. 1, architecture 100 includes a decentralized network, such as DLT network 110 having multiple nodes 120a, 120b, . . . 120n. Only three nodes are illustrated. However, of course, there can be any number of nodes in DLT Network 110. Each node executes node software to define the network and allow the nodes to communicate using a common protocol in a known manner.

Hashrate oracles 130, only one of which is illustrated, can each host a data port proxy computing device and act as an intermediary between the hashrate service provider, mining facility 150 in this example, and the hashrate consumer, mining pool 140 in this example. All work being done by a miner, such as mining facility 150, can be sent through the proxy of hashrate oracle 130, authenticated/validated by hashrate oracle 130, and the validation can be broadcast to nodes of DLT network 110. While the architecture of FIG. 1 is useful, it relies on a centralized interface, hashing oracle 130, which must be controlled by a trusted party and which is subject to attack.

Figure 2:
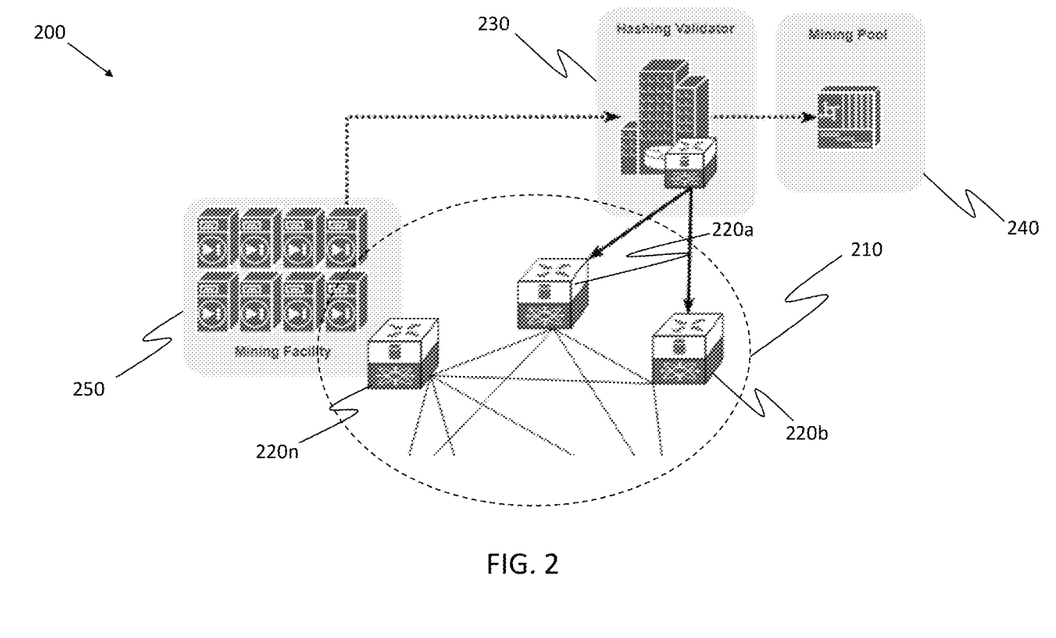
FIG. 2 is a schematic illustration of an architecture using a hashing validator to verify hashing power.

FIG. 2 illustrates a second level of integration of a data service into a decentralized network for providing the data service of hashpower for a POW consensus mechanism or the like. As shown in FIG. 2, architecture 200 includes a decentralized network, such as DLT network 210 having multiple nodes 220a, 220b, . . . 220n. Only three nodes are illustrated. However, of course, there can be any number of nodes in DLT Network 210. Each node executes node software to define the network and allow the nodes to communicate using a common protocol in a known manner. In architecture 200, the task of hashrate validation is moved from a centralized oracle, such as oracle 130 of FIG. 1, and is distributed amongst a federated group of "staked" hash validators 230. Hash validators 230 can be required to stake a bounty as collateral. As payment for their services hash validators 230 can be entitled to a small fee from each hashing contract it monitors. Hash validators 230 have the ability to prove hashing difficulty for each accepted pool share and submit proof of work completed to the network contract.

Architecture 200 can operate in a trustless and provable manner. A key part of this model is to be able to show that a validator is or isn't fulfilling its duty. If it can be proven that a validator has failed or become otherwise become a bad actor, the bad actor's staked bounty is forfeited and can be divided among other parties, such as the party reporting the improper activity to the hash contract participants. However, to fully decentralize the architecture, each node of the DLT network should be able to independently validate and broadcast its own hashing work to the rest of the network. Every share passed through the node to the pool would need to be verifiable by other nodes. Architecture 200 of FIG. 2 does not achieve this level of decentralization.

Figure 3:
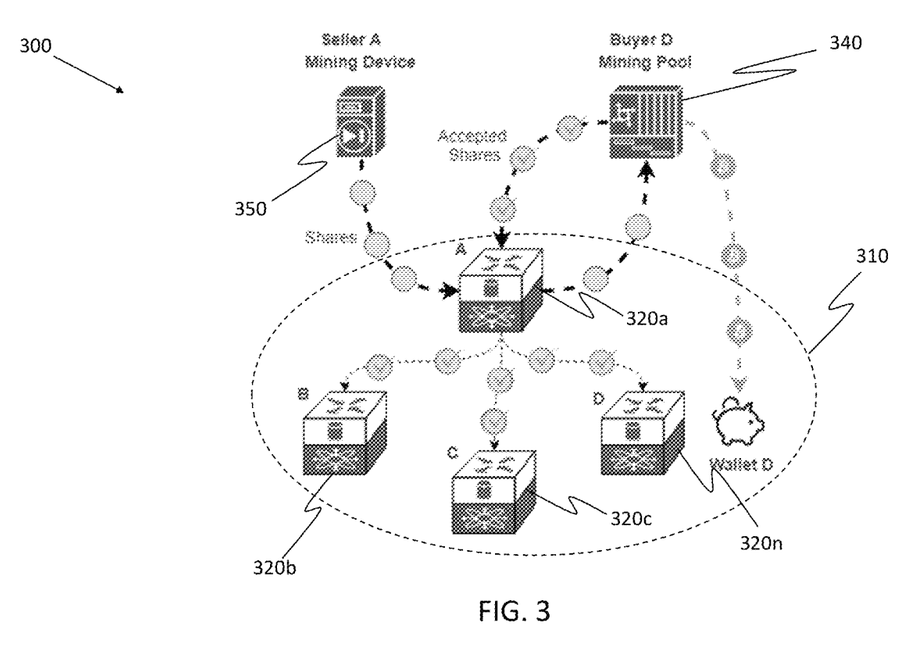
FIG. 3 is a schematic illustration of an architecture for verifying hashing power in a decentralized manner in accordance with a disclosed implementation.

FIG. 3 illustrates an architecture that fully leverages the advantages of decentralized networks to transform data services into decentralized commodities that can be offered, sold, provided and managed in a decentralized manner, i.e. without the need for any trusted central authority. As shown in FIG. 3, DLT network is defined by any number of node computing platforms, such as node computing platforms 320a, 320b, 320c . . . 320n, each executing DLT node software. In the example of FIG. 3, mining device 350 is the provider/seller of compute power (hashpower in this example) as a data service and mining pool 340 is the consumer of the data service.

Figure 4:
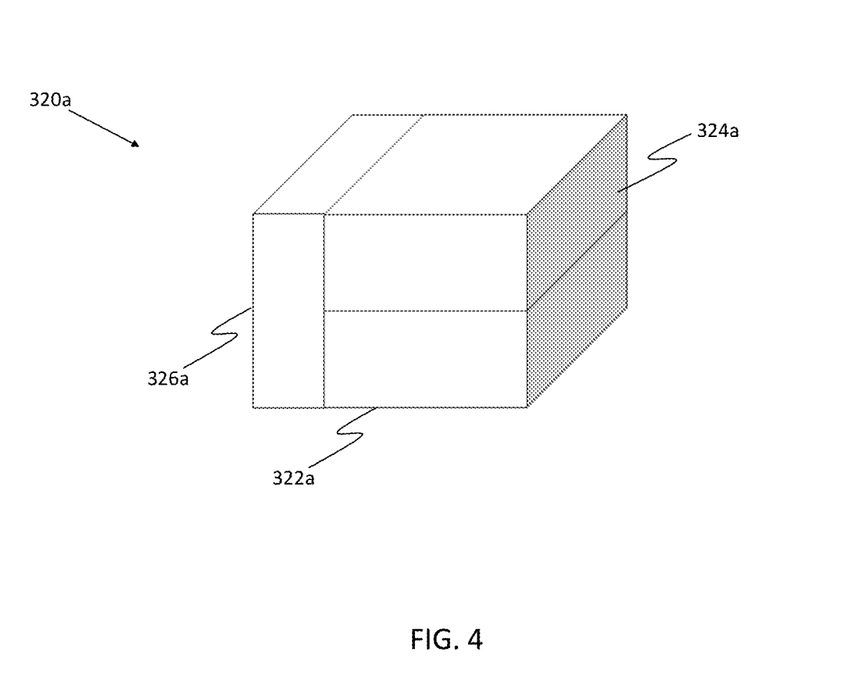
FIG. 4 is a block diagram of a node platform of FIG. 3.

Note that the novel architecture of node computing platforms 320a . . . n permit full decentralization and eliminate the need for validator 230 of FIG. 2 or hashing oracle 130 of FIG. 1. As shown in FIG. 4, each node computing platform (only 320a is shown in FIG. 4 for illustration) can include a node module, 322a in FIG. 4, and a router module, 324a in FIG. 4. Further, each node computing platform can have an associated cryptographic wallet, 326a in FIG. 4, that defines one or more addresses of the node computing platform on DLT network 310.

Node modules execute node software for DLT network 310. Nodes define a DLT network. As a decentralized peer-to-peer system, every node can be thought of as acting as a combined client and server. As a result, the duties of nodes are protocol-specific. Just as the HTTP protocol defines how the world-wide web works. DLT nodes communicate through a common protocol. The purpose of the node is to implement the network. As noted above, each node can have to store a complete copy of the distributed ledger and update the ledger based upon the consensus of the network as a whole. As a result, nodes can participate in a variety of activities, such as processing transactions. Parties connected to the DLT network will send their transactions to the node to be added to the ledger. The node is responsible for sending these transactions on to the rest of the network as well as forwarding on any transactions that it receives from other nodes to its peers in the network.

A router monitors and directs network data in the form of data packets. The data packets can have header information, such as sender, data type, size, and the destination address of the data packet on the network. The router determines the best route to use for each transmission based on the header information, network architecture, and network load.

As a result of this architecture, a node platform including an integrated node module and router module, each node computing platform can independently validate and broadcast its own hashing work to the other node computing platforms on DLT network 310. Every share passed to mining pool 340 through a node module of a node computing platform is verifiable by other nodes. To facilitate this verification, the protocol and data model of the node modules provides various attribute parameters of the service. In this example, the attributes can be: the hashing algorithm; difficulty target set by the pool; work assigned from the pool; and the share solution submitted by the miner; With the values of these attributes, each individual node module can recreate and verify all necessary activity, including that the submission was valid and above the difficulty target, in the manner set forth below.

The router modules monitor data from DLT network 310 and relevant data for the data service providers/sellers. For example, there may be multiple mining devices 350 all desiring to sell hashpower to mining pool 340. Each mining device can obtain configuration parameters based on a smart contract specification published on DLT network 310 and can establish communication with one or more node computing platforms. The mining pool can do the same through the same node computing platform(s) or different node computing platform(s) of DLT network 310.

Hashing power can be routed appropriately based on the corresponding smart contract stored on the node computing platforms of DLT network 310. The hashing power of mining device 350 drives actions on DLT network 310 as it flows through a router of one or more node computing platforms. Therefore, the flow of packets can trigger activity on DLT network 310 based on the smart contract. The relevant node computing platform confirms payment and pool info and redirects hashing power, again in accordance with the smart contact. When hash shares are transmitted from mining device 350 to mining pool 340, through node computing platform 320a, and corresponding share acceptance confirmations are received from mining pool 340, by node computing platform 320a, node computing platform 320a submits proof of the provision and acceptance of the service to the smart contract.

Payment can be made to the service provider (mining device 350 in this example) in accordance with the smart contract. For example, transferring a native token to a cryptographic wallet associated with the service provider in a known manner and recording the transaction on the ledger of DLT network 310. Various other actions, such as payments of commissions or other fees, notifications, or the like, can be made over DLT network 310 in accordance with the smart contract. The smart contract could also specify and effect payment of a service provider fee. The control routing of the service in a decentralized manner can drive smart contracts with any data flow and thus any data service can be provided as a decentralized commodity.

It can be seen that, in the implementation of FIG. 3, the combination of node software and a TCPIP proxy router facilitates network traffic and other route information to be submitted to DLT network 310 as proof of provision of and acceptance of a data service. Acceptance can be packaged as a proof receipt using known cryptographic techniques and sent to a smart contract on DLT network 310 which distributes tokens as payment or takes other actions based on any conditions specified in the smart contract.

Figure 5:
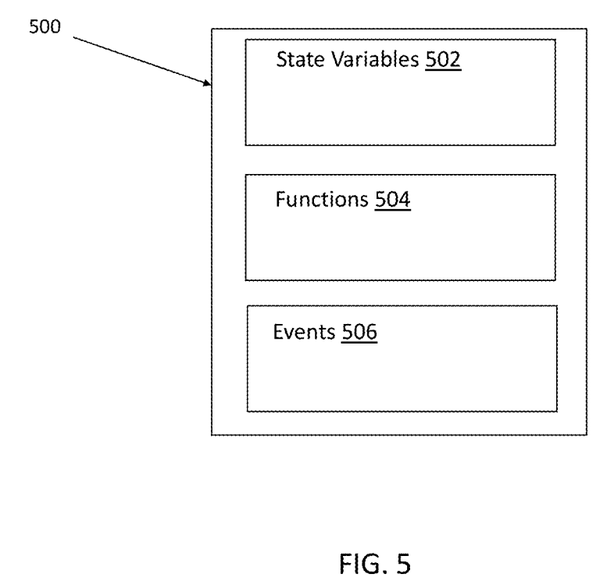
FIG. 5 is a schematic illustration of a smart contract data structure in accordance with a disclosed implementation.

FIG. 5 schematically illustrates a smart contract data structure in accordance with disclosed implementations. Data structure 500 can include state variables 502, functions 504, and events 506. State variables 502 define a set of variables that are used to describe the mathematical "state" of the smart contract and the network as it relates thereto. Functions 504 are the programed actions that the smart contract can take based on the values of the state variables. For example, a payFee function may be called in order to effect a payment for services based on the smart contract. Events 506 define actions that are used as inputs into the smart contract. For example, a serviceValidationReceived event can indicate the service of the contract has been validated as provided and received by the purchaser of the service.

Figure 6:
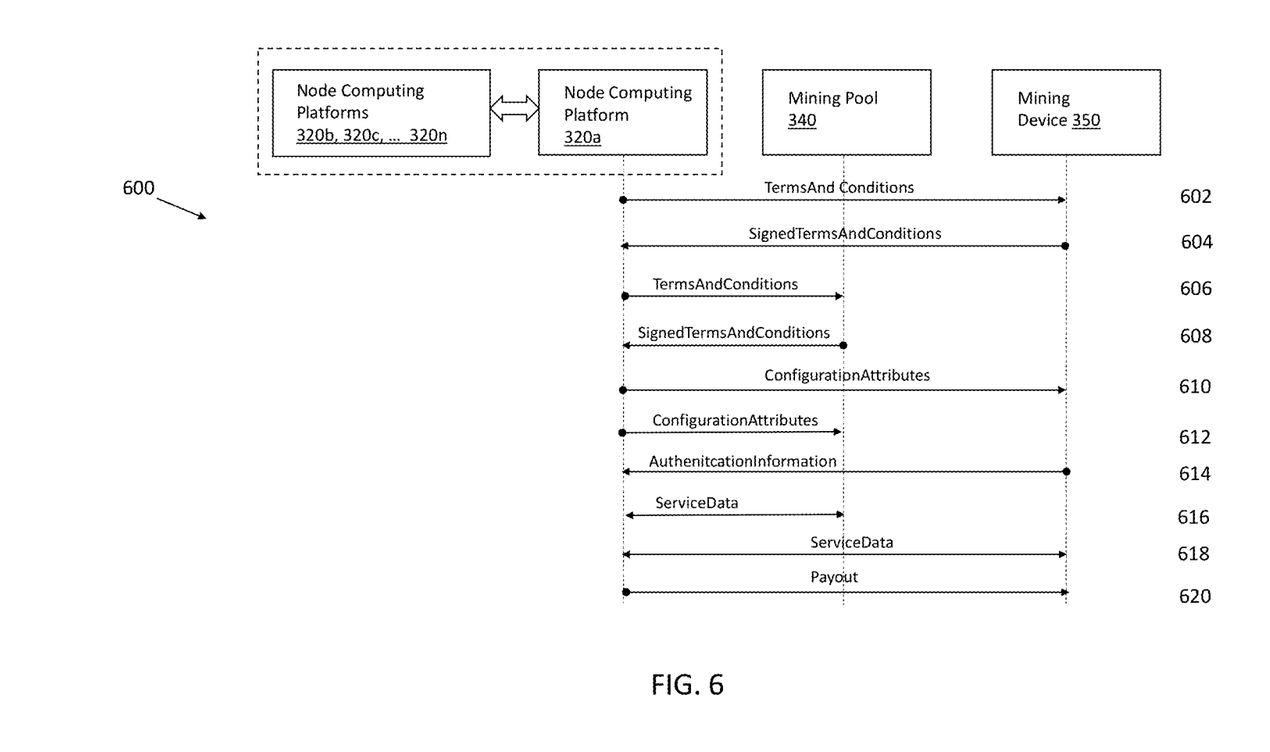
FIG. 6 is a schematic illustration of a messaging scheme in accordance with a disclosed implementation.

FIG. 6 is a flow chart of an example of a process 600 of providing a data service, by the architecture of FIG. 3 for example, in accordance with disclosed implementations. The messaging flow illustrated in FIG. 6 is defined by the corresponding smart contract executing on the DLT network. At 610, the applicable smart contract is coded and stored on DLT network 310 to define a service as a decentralized commodity. For example, the data structure disclosed with respect to FIG. 5 can be programmed and deployed on DLT network 310 in a known manner. As noted above, the smart contract can expose the logic thereof, network addresses, and other configuration information to allow a service provider to select the smart contract and to configure the service providing platform, such as mining device 350, to provide the service.

The terms and conditions of the contract are published to DLT network 310 in a known manner, such as through the market portal described below with respect to FIG. 7, and exposed to mining device 350 at 602 and to mining pool 340 at 606. Various tools such as Remix and Truffle are well known for creating and deploying smart contracts. The terms and conditions may include the required consensus algorithm, a difficulty target, the work/service to be provided, payment terms, and other requirements and/or obligations of the parties. Of course, terms can be dynamically set and selected by the parties. For example, the smart contract could specify multiple potential consensus algorithms and mining pool 340 could select and set the required algorithm to be included in the terms and conditions sent to mining device 350. In such a case, terms and conditions could be presented to mining pool 340 and set by mining pool 340 prior to presenting the terms and conditions to mining device 350.

Assuming that the terms and conditions are acceptable, mining device 350 returns signed and accepted terms and conditions to node 320a at 604 and mining pool does the same at 608. At 610 and 612, configuration attributes are sent to mining device 350 and mining pool respectively. The attributes can include necessary addresses for the node and the smart contract and any protocols required for communication. For example, the address of the router module(s) associated with the parties can be included in the configuration attributes.

At 614, mining device 350 presents authentication information, such as a smart contract address and an encryption private key as the pool credential password. Node computing platform 320a uses the smart contract address to retrieve destination data for the contract and opens an outgoing socket to the destination address and begins relaying data, to mining pool 340 at 616 and to mining device 350 at 618. The relayed data includes work data, shares, proofs and any other data required to execute the smart contract. Each packet of data received from the device will have the pool credential replaced with the buyer's credentials provided in the contract so that the buyer's account gets credited with the share submissions. Credentials of mining pool 340 will be encrypted with the public key of mining device 350 and stored in the smart contract so that only mining device 350 can retrieve them and mining pool 340 can remain somewhat anonymous to the rest of DLT network 310. Mining pool 340 responds to accepted shares with a confirmation signed with the network private key of mining device 340, this prevents the mining device 350 from forging fake shares. The smart contract can store the public key of the pool and validate each pool response before processing a fractional payout to mining device 350 at 620.

The example above relates to the provision of compute power in the form of hashpower. However, by using a robust smart contract compiler, a seller, or another party, may build a limitless amount of contract types. Examples of contract types include: long- and short-term individual device rentals; long and short term hashrate sourcing (cloud mining contracts); fixed unit of hashrate ownership; NFT device ownership; media streaming services/applications; compute time shares; and facility equity ownership. Further, smart contracts can include financialization around any data source, such as decentralized power markets for buying and selling power options, and various media and service compute functions.

Payment can be conducted over any network, including but not limited to TCP\IP, NFC, Bluetooth, beacons or a multitude of data ports. Payments can be in cryptocurrency, fiat, FX or using futures to drive hedging. Payment can also be made futures contracts or more exotic instruments such as taking delivery of a physical commodity(oil, gold, silver, real estate, and more).

In order to receive a payout, the seller can be required to supply valid shares, or other proof to the buyer. To prevent a buyer from cheating a seller by not responding to valid proof submissions there can be adequate incentive for the buyer to remain trustworthy. This can be accomplished through a virtual committee, automated process or another body regulators, such as government regulators.

Disclosed implementations also provide a centralized application, platform, and user portal for creation of commodity smart contracts and the buying, selling, leasing, and trading of digital products that are related to data services, including hash power routing, hash power, or other services. The platform can include one or more devices, which can be logical, fixed or virtual devices, based in the cloud or a hard-serviced location like an office, an oil field, or terrestrial station located anywhere. The devices can be land based, sea based (e.g., located on a wind farm, or an offshore oil rig).

The system can be used to create service futures and contracts, including mining contracts, contracts for rental of a device, derivative contracts for the future delivery of hash power, the future benefit of a mining outcome, and using both upward and downward bets on the value of mining outputs. The system can also be used to buy, sell, or trade electricity through the mechanism of hash power in the form of options, futures, contracts, or other financial or similar type products or instruments.

A user (e.g., person, company or consortium, customer, seller, buyer or intermediary) can sell hash power into the marketplace, and get paid via fiat, currency, future contracts, native tokens, or other tokens. The buyer can review proceeds, control and route service via a management console, or through a 3rd party\external software. A user can build a mining pool (virtual or real) by purchasing via payment, fiat, loan proceeds, promissory notes or the like and token(s).

Figure 7:
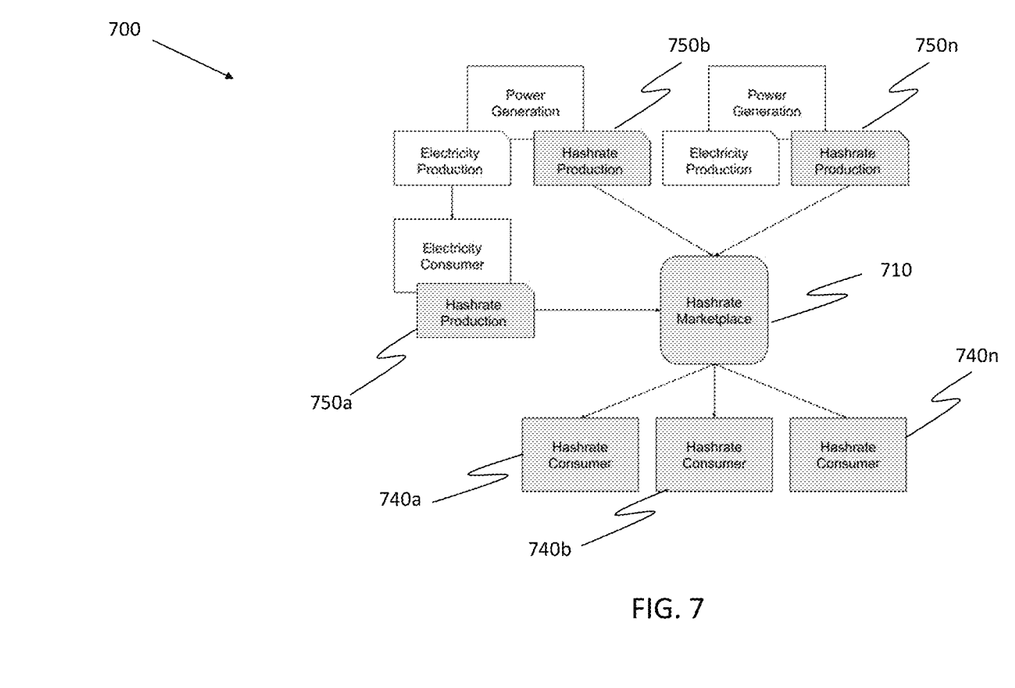
FIG. 7 is a schematic illustration of a digital service market architecture in accordance with a disclosed implementation.

FIG. 7 illustrates an example of a hashrate marketplace flow diagram 700. Power generation, and hash production of multiple hashrate suppliers 750a, b, c . . . n, such as mining facilities/devices, and hashrate consumers 740a, b, . . . n, such as mining pools, are all coupled to nodes of a DLT network in the manner described above. Further, market platform 710 is associated with a node on the DLT network to provide decentralized communication with other nodes and the creation of smart contracts to be published in the manner described above. Market platform 710 provides a portal for a user to created, trade and manage the services/contracts described above.

The various functions disclosed herein can be accomplished by one or more computing devices having processors which execute instructions stored in one or more tangible computer readable memories. The various devices can be communicatively coupled to one another in known manners using known protocols. For example, the devices can be coupled over a Local Area Network or the Internet and affect ledgers that may reside on centralized, private decentralized, or public decentralized networks.

In some implementations, the system may include one or more computing devices which may be configured to communicate with one or more client computing platforms according to a client/computing device architecture and/or other architectures. Client computing platforms may be configured to communicate with other client computing platforms via computing device and/or according to a peer-to-peer architecture and/or other architectures. Users may access the system via client computing platforms.

All computing devices may be configured by machine-readable instructions which may define one or more instruction modules. The computing devices may include communication lines, or ports to enable the exchange of information with a network and/or other computing platforms. Computing device may include a plurality of hardware, software, and/or firmware components operating together to provide the functionality attributed herein to computing devices.

Electronic storage may include non-transitory storage media that electronically stores information. The electronic storage media may include one or both of system storage that is provided integrally (i.e., substantially non-removable) with computing devices and/or removable storage that is removably connectable to computing devices via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 130 may include one or more virtual storage resources (e.g., cloud storage, a virtual private network, and/or other virtual storage resources). The electronic storage may store software algorithms, information determined by processors, information received from computing devices and/or other information that enables the computing devices to function as described herein.

Processors may be configured to provide information processing capabilities in computing devices and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

Additional alternative structural and functional designs may be implemented for enforcing compliance policies on decentralized financial transactions. Thus, while implementations and examples have been illustrated and described, it is to be understood that the invention is not limited to the precise construction and components disclosed herein. Various modifications, changes and variations may be made in the arrangement, operation and details of the method and apparatus disclosed herein without departing from the spirit and scope of the invention defined in the appended claims.

What is claimed is:

1. A method implemented on a decentralized distributed ledger technology (DLT) network of computing devices for routing data services over the DLT network, the DLT network including multiple node computing platforms communicating over a network in a peer to peer manner, each node computing platform including a decentralized node protocol module and a corresponding network router module, whereby the node computing platforms each define a node of the DLT network that records data on a shared ledger in accordance with a consensus mechanism, the method comprising:

monitoring, by a router module of at least one of the node computing platforms, data flow through at least one node computing platform of the DLT network, wherein the at least one node computing platform is operatively coupled with a data service computing system that performs a data service and is external to the DLT network, wherein the router module comprises one or more physical computer processors executing computer readable instructions;

detecting, by the router module of the at least one node computing platform, data flow relevant to provision of the data service by receiving data from the data service computing system that indicates the data flow;

receiving, by the router module of the at least one of the node computing platforms and from the data service computing system, a data structure indicating attributes of the provision of the data service;

routing, by the router module of the at least one of the node computing platforms, the data flow in a predetermined manner through the node in accordance with a smart contract stored on the shared ledger;

authenticating, using the consensus mechanism, the data flow to confirm that data service has been received by a specified recipient;

routing digital tokens from a first cryptographic wallet address to second cryptographic wallet address in the DLT network, in accordance with the smart contract, as compensation for the provision of the data services;

receiving, by the at least one of the node computing platforms, authentication information from a service provider, the authentication information including an address of the smart contract and an encryption private key;

retrieving, by the at least one of the node computing platforms, destination data for the smart contract; and opening an outgoing socket to the destination address to permit service data to be relayed to a service recipient.

2. The method of claim 1 wherein each decentralized node protocol module and a corresponding network router module are integrated into a single computing device.

3. The method of claim 1, wherein the attributes of the provision of the data service are specified in the smart contract and include a type of service to be provided, payment amounts, and service levels.

4. The method of claim 1, wherein the service data includes work data and proofs required by the smart contract.

5. The method of claim 1, wherein the data service is at least one of: individual device rentals; hashrate sourcing including cloud mining contracts; fixed unit of hashrate ownership; device ownership through Non-Fungible Token ownership; media streaming services/applications; compute time shares; and/or facility equity ownership.

6. The method of claim 1, wherein the service includes financialization of a data source.

7. The method of claim 1, wherein the service is a decentralized power market for buying and selling power options.

8. A computing architecture for executing a smart contract on a DLT network of computing devices for routing data services over the DLT network, the computing architecture comprising:
   at least one processor;
   at least one memory device;
   a smart contract stored in the at least one memory device; and
   a plurality of node computing platforms communicating over a network in a peer to peer manner, each node computing platform including a DLT node protocol module and a corresponding network router module, whereby the node computing platforms each define a node of the DLT network that records data on a shared ledger in accordance with a defined protocol and consensus mechanism and whereby the network router modules are configured to route data services and provide data as events to the smart contract, wherein the smart contract includes executable code stored on the shared ledger;

wherein when executed by the at least one processor on at least one of the node computing platforms, the smart contract causes the at least one of the node computing platforms to:
   monitor, by a router module of the at least one of the node computing platforms, data flow through at least one node computing platform of the DLT network, wherein the at least one node computing platform is associated with a data service external to the DLT network;
   detect, by the router module of the at least one node computing platform, data flow relevant to provision of the data service;
   receive, by the router module of the at least one of the node computing platforms, a data structure indicating attributes of the provision of the data service;
   route, by the router module of the at least one of the node computing platforms, the data flow in a predetermined manner through the node in accordance with the smart contract, the smart contract stored on the shared ledger;
   authenticate, using the consensus mechanism, the data flow to confirm that data service has been received by a specified recipient;
   route compensation, in the form of digital tokens, for the provision of the data service through the router module in accordance with the smart contract;
   receive authentication information from a service provider, the authentication information including an address of the smart contract and an encryption private key;
   retrieve destination data for the smart contract; and
   open an outgoing socket to the destination address to permit service data to be relayed to a service recipient.

9. The computing architecture of claim 8, wherein each decentralized node protocol module and a corresponding network router module are integrated into a single computing device.

10. The computing architecture of claim 8, wherein the attributes of the provision of the data service are specified in the smart contract and include a type of service to be provided, payment amounts, and service levels.

11. The computing architecture of claim 8, wherein the service data includes work data and proofs required by the smart contract.

12. The computing architecture of claim 8, wherein the data service is at least one of: individual device rentals; hashrate sourcing including cloud mining contracts; fixed unit of hashrate ownership; device ownership through Non-Fungible Token ownership; media streaming services/applications; compute time shares; and/or facility equity ownership.

13. The computing architecture of claim 8, wherein the service includes financialization of a data source.

14. The computing architecture of claim 8, wherein the service is a decentralized power market for buying and selling power options.

* * * * *